United States Patent Office 3,336,381
Patented Aug. 15, 1967

3,336,381
PROCESS FOR PREPARING ARYL-SUBSTITUTED ALKANOIC THIOAMIDES
Everett E. Gilbert, Morris Township, Morris County, and Edmund J. Rumanowski, Dover, N.J., assignors to Allied Chemical Corporation, New York, N.Y., a corporation of New York
No Drawing. Filed Mar. 23, 1965, Ser. No. 442,187
8 Claims. (Cl. 260—551)

This invention relates to a process for preparing aryl-substituted alkanoic thioamides.

This application is a continuation-in-part of our copending application, Ser. No. 256,824, filed Feb. 7, 1963, now U.S. Patent No. 3,274,243.

Aromatic thioamides have been prepared in the past in good yields by the reaction of aromatic cyanides with hydrogen sulfide in pyridine solution in the presence of a base such as triethyl amine. On the other hand, the preparation of alkanoic thioamides by this process has resulted in poor yields which are insufficient to make this process commercially feasible.

In our copending application above referred to, there is described a process for the preparation of alkanoic thioamides in good yields by the reaction of alkanoic mononitriles with hydrogen sulfide in the presence of a strongly basic secondary amine used in an amount at least stoichiometrically equivalent to the amount of hydrogen sulfide used and wherein the amine —$H_2S$ salt thus provided is in at least 1:10 molecular proportion to the nitrile therein.

It is known to prepare aryl-substituted alkanoic thioamides, specifically phenylthioacetamide, by the action of liquid hydrogen sulfide on benzyl cyanide under superatmospheric pressure, in the presence of relatively small amounts of diethyl amine.

We have now found that aryl-substituted alkanoic thioamides can be prepared in good yields by subjecting a liquid reaction mixture of an aryl-substituted alkanoic mononitrile and at least a stoichiometrically equivalent proportion of a secondary amine to the action of gaseous hydrogen sulfide at atmospheric pressures and temperatures between about 20° C. and the reflux temperatures of the mixture for a period of at least about 60 minutes.

The process of our invention proceeds according to the following equation:

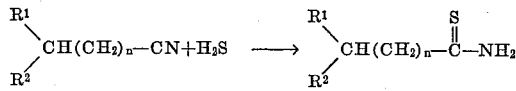

wherein $R^1$ is either hydrogen, phenyl, naphthyl, or substituted phenyl or substituted naphthyl; $R^2$ is phenyl, naphthyl or substituted phenyl or substituted naphthyl; and $n$ is an integer from 0 to 3 inclusive.

The substituents on the phenyl groups can be, for example, halogens such as chlorine, bromine, fluorine and iodine, fused phenyl substitution, nitro, trifluoromethyl, lower alkyl, lower alkyloxy, and the like.

Suitable aryl-substituted alkanoic nitriles useful as starting compounds in our invention include phenyl acetonitrile, naphthyl acetonitrile, diphenyl acetonitrile, 2,6-dichlorophenyl acetonitrile, methylphenyl acetonitrile, ethylphenyl acetonitrile, phenyl propionitrile, naphthyl propionitrile phenyl butyronitrile and the like.

The present invention provides an improvement over the prior art processes in providing for the production of aryl-substituted alkanoic thioamides in short reaction times at atmospheric pressures, and with the use of gaseous hydrogen sulfide and at mild temperatures, preferably between about 35° C. and about 60° C.

The invention contemplates the production of aryl-substituted alkanoic thioamides wherein hydrogen sulfide is added to a mixture of an aryl-substituted alkanoic mononitrile and at least one strongly basic amine of the group consisting of secondary amines, quaternary ammonium hydroxides, and tetraalkyl guanidines, said amine being employed in at least about 1 molecular proportion of amine for each molecular proportion of nitrile employed in the reaction mixture, maintaining temperatures in the range of 35° C. reflux and about atmospheric pressures; and terminating the reaction in not over about 6 hours.

The liquid reaction medium may be composed of any liquid polar aprotic solvent for the reaction mixture which solvent has a dielectric constant of at least 30 determined at 25° C. Examples of suitable solvents are dimethyl formamide, dimethyl sulfoxide, and sulfolane (tetrahydrothiophene-1,1-dioxide).

Preferred reaction temperatures are 35° to 60° C. and preferred reaction times are not over about 6 hours, and when $n$ in the above formula is one, the reaction time is not over about 2 hours, usually only about 1 hour. Preferred amines are di-lower alkyl amines especially diethylamine; tetramethylguanidine; or benzyltrimethyl ammonium hydroxide or a polymer in which the backbone is polyvinyl and the substituents are benzyltrimethyl ammonium hydroxide. The term "strongly basic amine," as used herein, contemplates those amines having a pKa value in an aqueous solution at 25° C. of at least 8.0.

In a preferred embodiment of the invention, dimethylformamide is present as the reaction solvent.

The term "di(lower alkyl) amines," as used herein, contemplates amines such as diethylamine, di(sec butyl) amine, di(n-propyl) amine, di(isopropyl) amine and the like, wherein the alkyl group has from 1 to 4 carbon atoms in its chain. The term "saturated cyclic secondary amines" contemplates compounds such as pyrrolidine and piperidine. The term "quaternary ammonium hydroxides" includes compounds such as benzyltrimethyl ammonium hydroxide and the like, while the term "tetraalkyl guanadine" contemplates compounds such as tetramethylguanadine which is a tetra-(lower alkyl)-guanadine, one of the preferred strongly basic amines.

We have found that by using stoichiometric amounts of amine in relation to the amount of nitrile present in our reaction that yields as high as 80% and more, of the aryl-substituted alkanoic thioamide based on the moles of nitrile charged, can readily be accomplished without employing pressure or extended reaction periods. We have further discovered that a mole ratio of amine:nitrile not less than 1:1 will assure excellent yields of thioamide, together with a high conversion rate. Larger quantities of amine can be used.

The duration of the reaction, i.e., the time of addition of the $H_2S$ gas into the system plus any time allotted for further reaction in the reaction vessel (digestion time) varies somewhat with the length of the aliphatic chain attached to the nitrile group, the two and three methylene group compounds requiring somewhat longer reaction times for completion of the conversion.

In our process we preferably add the $H_2S$ gas into the system at a rapid rate and allow the solution to digest over a period of 30 to 60 minutes but, as indicated above, we maintain the total reaction time at 6 hours or less.

Our process may, however, be performed without the use of a digestion period, i.e., by adding the hydrogen sulfide into the system at a relatively slow rate over a period of an hour or so but always maintaining a reaction time not in excess of the 6-hour maximum limit. In such a case, no digestion is required, and the yield will be equally excellent.

It is theorized that in our system when the hydrogen sulfide enters the system, it reacts with the amine to form a complex salt. This salt, in turn, reacts with the nitrile forming the corresponding thioamide and regenerating the amine, which can be largely recovered at the termination of the reaction period.

We have found that the recovery of the thioamide produced should be such that prolonged heating of the product in the presence of the catalyst is avoided.

Since most of the aryl-substituted thioamides are solids at ordinary room temperatures (ca. 20–25° C.), they can be readily recovered by quenching the reaction mixture in a non-solvent, such as water, recovering the aryl-substituted thioamide by filtration, and purifying the product by recrystallization from a suitable solvent.

Since our reaction is operated at atmospheric pressure, no special reaction vessel such as an autoclave need be employed. Since the process is performed at moderately elevated temperatures, it is preferred that the reaction vessel be fitted for refluxing to prevent the loss of constituents of the reaction mixture.

Reaction solvents which may be used in our process include in particular, dimethylformamide. In the case where dimethylformamide is employed as a solvent, separation of the reaction product may be obtained readily by quenching the entire reaction mixture in water for recovery of the water-insoluble thioamide product and unreacted nitrile and dissolving the unreacted nitrile in a solvent in which the thioamide is insoluble.

In a preferred embodiment of carrying out our invention, the aryl-substituted alkanoic nitrile, which is usually a solid, is mixed with at least an equimolecular quantity of the strongly basic amine and with a sufficient quantity of a polar liquid reaction medium to dissolve the nitrile and the subsequently formed thioamide and to provide a readily fluid reaction medium. The amount of solvent used is not critical, a quantity between about 2 and about 10 times the combined weight of the nitrile and amine reactants usually being sufficient. When the above reactants have dissolved, hydrogen sulfide gas is introduced into the liquid reaction medium, conveniently at normal room temperature (ca. 20–25° C.). The reaction is somewhat exothermic so that the temperature rises. We preferably maintain the temperature below about 45° C. during the H₂S introduction, which is preferably carried out gradually, for example, over a period of say 5 to 20 minutes.

After the theoretical amount of H₂S has been added, or a slight excess if desired, the reaction medium is preferably heated to a slightly elevated temperature, for example, to between about 40° C.–60° C. for a few minutes, for example, between about 5 minutes and about 60 minutes to assure completion of the reaction. The resulting aryl-substituted alkanoic thioamide is then recovered, conveniently by quenching the mixture in a non-solvent for the thioamide such as water, i.e., by the addition of, for example, a quantity of water 3 to 10 times the volume of the reaction medium, whereby the thioamide is precipitated and can be mechanically separated as by filtration, decantation, or the like.

In order to more fully illustrate the nature of this invention and the manner of practicing the same, the following examples are presented. In these examples, all percentages of yield of thioamide produced are percentages of theory based on the moles of amine or H₂S supplied, whichever is below specified. Furthermore, all weight is in grams and temperature is in degrees centigrade unless they are indicated to be otherwise.

Example 1

To 8.4 parts (0.05 mole) of α-naphthyl acetonitrile and 4.4 parts (0.06 mole) of diethyl amine in 50 parts of N,N-dimethyl formamide, was added 4 parts of hydrogen sulfide gas (0.12 mole) over a period of 8 minutes while maintaining the temperature of the reaction mixture between 40° and 45° C. The mixture was then heated at 55° to 60° C. for 40 minutes, and was then diluted with 3 to 4 times its volume of water. The resulting precipitated solid product was filtered and dried yielding 8 parts of alpha naphthyl thioacetamide equivalent to a yield of 60%. The product, crystallized from methyl alcohol, had a melting point of 169° to 170° C. Its formula is

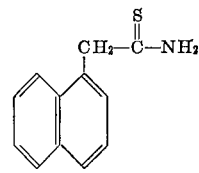

When Example 1 was repeated using a ratio of diethyl amine to α-naphthyl acetonitrile of 0.06 to 1, the yield of naphthyl thioacetamide was only 20%.

Example 2

To 7.6 parts (0.05 mole), of p-chlorobenzyl cyanide and 4.4 parts (0.06 mole) of diethyl amine in 50 parts of N,N-dimethyl formamide was added 4 parts (0.12 mole) of hydrogen sulfide gas over a period of 10 minutes at a temperature below 45° C., i.e., between about 20° and 45° C. The resulting mixture was then heated at about 55° to 60° C. for 30 minutes and was then diluted with 3 to 4 times its volume of water. The precipitated product was filtered and dried yielding 7.5 parts of p-chlorophenylthioacetamide equivalent to an 80% yield. The product, crystallized from benzene had a melting point of 129° C. Its formula is

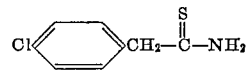

Example 3

To 12.0 parts (0.065 mole) of 2,6-dichlorophenyl acetonitrile and 5.3 parts (0.072 mole) of diethyl amine in 35 parts of N,N-dimethyl formamide was added 4.5 parts of hydrogen sulfide gas over a period of 10 minutes, while maintaining the temperature of the mixture below 45° C., i.e., between about 20° C. and 45° C. The mixture was then heated at 55° to 60° C. for 45 minutes and then diluted with about 3 to 4 times its volume of water. The resulting precipitated solid product was filtered and dried yielding 13 parts 2,6-dichlorophenylthioacetamide equivalent to a yield of 86%. The product crystallized from toluene had a melting point of 191° to 192° C. Its formula is

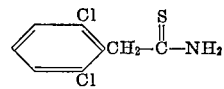

Example 4

To 5.7 parts (0.03 mole) of 1,1-diphenyl acetonitrile and 2.4 parts (0.033 mole) of diethyl amine in 25 parts of N,N-dimethyl formamide was added 1.1 parts (0.033 mole) of hydrogen sulfide gas over a period of 10 minutes while maintaining the temperatures of the mixture between about 20° C. and about 40° C. The mixture was then heated at 60° to 65° C. for ½ hour, and then diluted with about 3 to 4 times its volume of water. The resulting precipitated product was filtered and dried, yielding 6 parts of 1,1-diphenylthioacetamide. The product, crystallized from methyl alcohol had a melting point of 146°–149° C. Its formula is

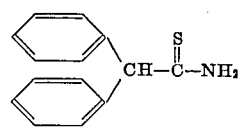

When the above example was repeated in a manned identical to that described above except that the ratio of diethyl amine to diphenyl acetonitrile was 0.1 to 1.0, only a trace of diphenyl thioacetamide was obtained.

While the above describes the preferred embodiments of our invention, it will be understood that departures can be made therefrom within the scope of the specification and claims.

We claim:

1. The process for the production of an aryl thioamide which consists of preparing a mixture of (1) an aryl aliphatic nitrile of the formula

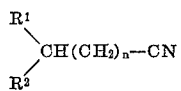

wherein $R^1$ is a member selected from the group consisting of hydrogen, phenyl, naphthyl, halo-, nitro-, trifluoromethyl-, lower alkyl-, and lower alkoxyphenyl and halo-, nitro-, trifluoromethyl-, lower alkyl-, and lower alkoxynaphthyl; $R^2$ is a member selected from the group consisting of phenyl, naphthyl, halo-, nitro-, trifluoromethyl-, lower alkyl-, and lower alkoxyphenyl and halo-, nitro-, trifluoromethyl-, lower alkyl-, and lower alkoxynaphthyl, and wherein $n$ is an integer from 0 to 3 inclusive; (2) a quantity at least stoichiometrically equivalent to the nitrile, of an amine selected from the group consisting of a diloweralkylamine, a tetraloweralkylguanidine and a benzyltriloweralkyl ammonium hydroxide having a pKa value in aqueous solution at 25° C. of at least 8.0; and (3) a quantity of a liquid polar aprotic solvent having a dielectric constant of at least about 30 determined at 25° C., introducing into such mixture at temperatures below about 45° C. hydrogen sulfide gas in an amount at least stoichiometrically equivalent to the nitrile in the mixture, heating the resulting mixture at a temperature between about 50° C. and the reflux temperature of the mixture, for a period of at least about 60 minutes, and not more than about 6 hours.

2. The process according to claim 1 wherein the amine is diethylamine.

3. The process according to claim 1 wherein the polar solvent is dimethyl formamide.

4. The process according to claim 1 wherein the aryl-substituted aliphatic nitrile is α-naphthyl acetonitrile.

5. The process according to claim 1 wherein the nitrile is p-chlorophenylacetonitrile.

6. The process according to claim 1 wherein the nitrile is 2,6-dichlorophenylacetonitrile.

7. The process according to claim 1 wherein the nitrile is 1,1-diphenylacetonitrile.

8. The process for the preparation of an aryl thioamide which consists of preparing a mixture of (1) an aryl aliphatic nitrile of the formula

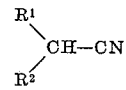

wherein $R^1$ is a member selected from the group consisting of hydrogen, phenyl, naphthyl, chlorophenyl and chloronaphthyl; $R^2$ is a member selected from the group consisting of phenyl, naphthyl, chlorophenyl and chloronaphthyl; (2) a quantity at least stoichiometrically equivalent to the nitrile of an amine selected from the group consisting of a diloweralkylamine, a tetraloweralkylguanidine and a benzyltriloweralkyl ammonium hydroxide, having a pKa value in aqueous solution at 25° C. of at least 8.0, and (3) a quantity of a liquid polar aprotic solvent selected from dimethyl formamide, dimethyl sulfoxide and sulfolane, introducing into such mixture at temperatures below about 45° C., hydrogen sulfide gas in an amount at least stoichiometrically equivalent to the nitrile in the mixture, heating the resulting mixture at a temperature between about 50° C. and the reflux temperature of the mixture, for a period of at least about 60 minutes and not more than about 6 hours.

References Cited

Houben-Weyl: Methoden der Organischen Chemie, vol. 9, pp. 762–63 (1956).

WALTER A. MODANCE, *Primary Examiner.*

JOHN D. RANDOLPH, *Examiner.*

H. I. MOATZ, *Assistant Examiner.*